(12) United States Patent
Nguyen et al.

(10) Patent No.: US 10,187,113 B2
(45) Date of Patent: Jan. 22, 2019

(54) DOWNHOLE TELEMETRY USING MOTOR CURRENT SPIKES

(71) Applicant: Halliburton Energy Services, Inc., Houston, TX (US)

(72) Inventors: Nam Nguyen, Singapore (SG); Colin Koo, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/755,227

(22) PCT Filed: Nov. 9, 2015

(86) PCT No.: PCT/US2015/061500
§ 371 (c)(1),
(2) Date: Feb. 26, 2018

(87) PCT Pub. No.: WO2017/086962
PCT Pub. Date: May 26, 2017

(65) Prior Publication Data
US 2018/0248584 A1 Aug. 30, 2018

(51) Int. Cl.
*E21B 47/12* (2012.01)
*H04B 3/46* (2015.01)
(Continued)

(52) U.S. Cl.
CPC .......... *H04B 3/46* (2013.01); *E21B 41/0085* (2013.01); *E21B 47/12* (2013.01); *H04B 3/54* (2013.01);
(Continued)

(58) Field of Classification Search
CPC .. H04B 3/46; H04B 3/54; E21B 47/12; E21B 44/00; E21B 47/13
(Continued)

(56) References Cited

U.S. PATENT DOCUMENTS 4,837,753 A 6/1989 Morris et al.
4,995,058 A 2/1991 Byers et al.
(Continued)

FOREIGN PATENT DOCUMENTS

WO 2015073420 5/2015

OTHER PUBLICATIONS

Dominguez-Morales et al., "An AER to CAN Bridge for Spike-Based Robot Control", vol. 6691, 2011, pp. 124-132.
(Continued)

*Primary Examiner* — Albert K Wong
(74) *Attorney, Agent, or Firm* — Kilpatrick Townsend & Stockton LLP

(57) ABSTRACT

A well tool for use in a wellbore can include a motor for performing a well operation. The well tool can include a switch that is couplable between the motor and a wireline. The switch can be toggleable between (i) a first operational state for providing the power to the motor by coupling the motor to an external power source and (ii) a second operational state for decoupling the motor from the external power source. The well tool can include a motor controller coupled to the switch for toggling the switch between the first operational state and the second operational state in an arrangement configured to impart, on the wireline, multiple current pulses including data encoded in the current pulses according to an encoding scheme.

20 Claims, 12 Drawing Sheets

(51) Int. Cl.
 *E21B 41/00* (2006.01)
 *H04B 3/54* (2006.01)
(52) U.S. Cl.
 CPC ............. *H04B 2203/5412* (2013.01); *H04B 2203/5475* (2013.01); *H04B 2203/5483* (2013.01)
(58) Field of Classification Search
 USPC ........................................ 307/114; 340/853.1
 See application file for complete search history.

(56) References Cited

U.S. PATENT DOCUMENTS

| | | | | |
|---|---|---|---|---|
| 5,574,319 A * | 11/1996 | Bennett | ............... | H02B 1/24 307/112 |
| 5,895,985 A * | 4/1999 | Fischer | ............... | H01H 9/54 307/114 |
| 7,132,958 B2 | 11/2006 | Dodge et al. | | |
| 2008/0157604 A1 * | 7/2008 | You | ............... | G08C 17/02 307/114 |
| 2008/0272932 A1 | 11/2008 | Booker et al. | | |
| 2010/0065329 A1 | 3/2010 | Zientarski | | |
| 2010/0079006 A1 * | 4/2010 | Grice | ............... | H05B 37/0209 307/114 |
| 2010/0176661 A1 * | 7/2010 | Wilson | ............... | H05B 37/0263 307/114 |
| 2010/0286800 A1 | 11/2010 | Lerche et al. | | |
| 2011/0074222 A1 * | 3/2011 | Steiner | ............... | H05B 37/0254 307/114 |
| 2013/0106615 A1 | 5/2013 | Prammer | | |
| 2014/0118158 A1 | 5/2014 | Parra et al. | | |

OTHER PUBLICATIONS

Jimenez-Fernandez et al., "A Neuro-Inspired Spike-Based PID Motor Controller for Multi-Motor Robots with Low Cost FPGAs", Sensors, vol. 12, No. 4, 2012, pp. 3831-3856.
International Patent Application No. PCT/US2015/061500, "International Search Report and Written Opinion", dated Aug. 18, 2016, 18 pages.

* cited by examiner

DOWNHOLE TELEMETRY USING MOTOR CURRENT SPIKES

TECHNICAL FIELD

The present disclosure relates generally to devices for use in well systems. More specifically, but not by way of limitation, this disclosure relates to downhole telemetry using motor current spikes.

BACKGROUND

A wellbore can be drilled from a subterranean formation for extracting hydrocarbons (e.g., oil or gas) from the subterranean formation. Various well tools can be positioned in the wellbore for performing well operations. For example, a well tool that includes a sensor can be positioned in the wellbore for measuring characteristics of the wellbore.

DETAILED DESCRIPTION

Figure 1:
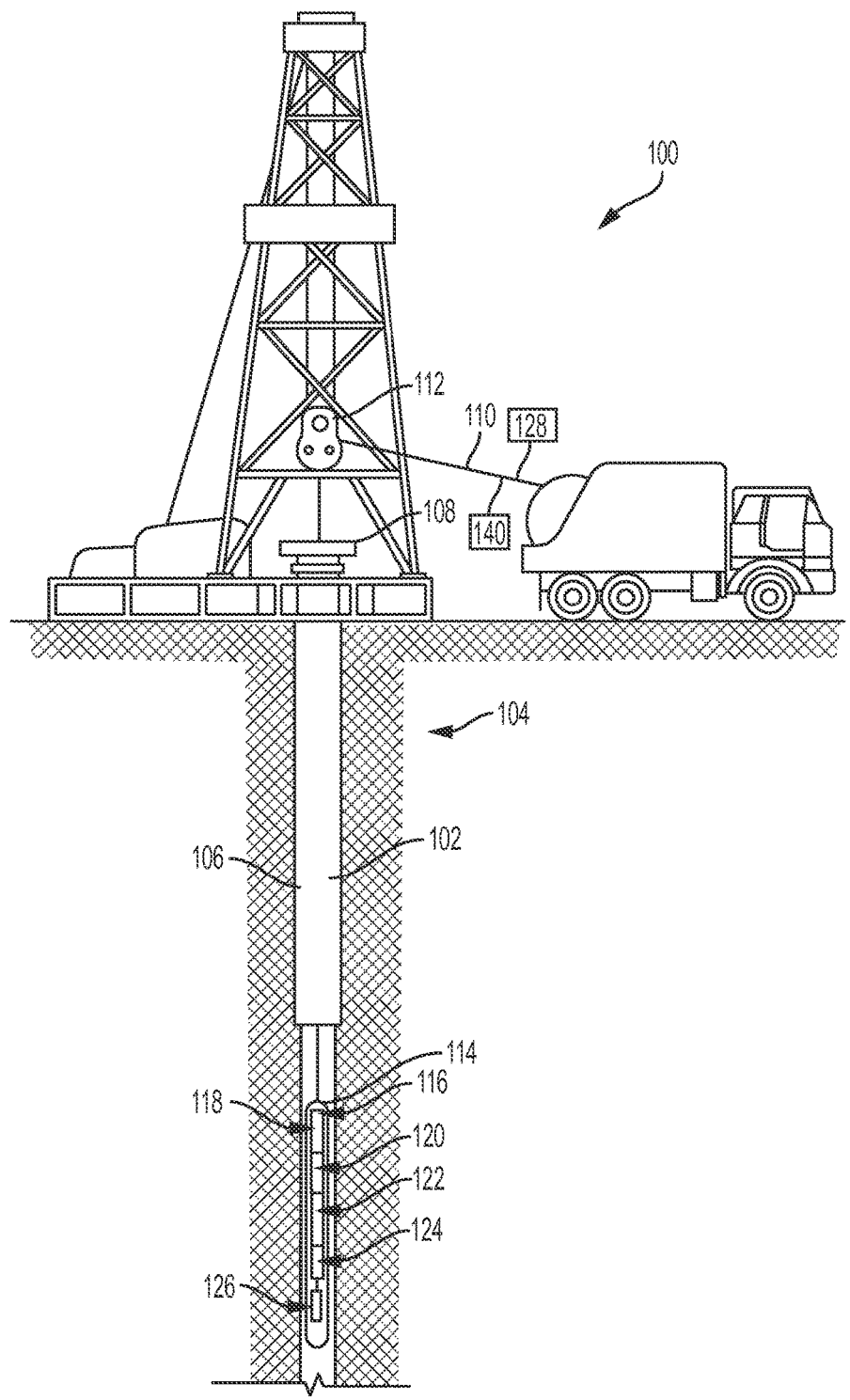
FIG. 1 is a cross-sectional view of an example of a hydrocarbon extraction well system that includes a subsystem for implementing downhole telemetry using motor current spikes according to some aspects.

Certain aspects and features of the present disclosure relate to downhole telemetry using motor current spikes (e.g., current pulses). Such features can be implemented via a well tool that can include a motor controller for operating a motor of the well tool. In some examples, the motor controller can toggle a switch between at least two positions to operate the motor at a desired speed, with a desired torque, or both. For example, the motor controller can transmit a pulse-width-modulated signal to the switch configured to cause the switch to toggle between an open position and a closed position according to a particular pattern. The pattern can be configured to regulate an amount of current drawn by the motor, thereby controlling the speed, torque, or both of the motor. But toggling the switch between positions can generate one or more current spikes (e.g., transient current spikes) in a wireline that supplies the current to the motor. Other well communication techniques may regard such current spikes as disruptive and undesirable noise, and therefore include filters and other electronics for reducing or eliminating the current spikes. The filters and other electronics can be costly and take up limited space in the well tool. But, in some examples, the current spikes can be converted into a communication signal for communicating data uphole (e.g., to a surface of the wellbore).

The current spikes can be converted into a communication signal by encoding data (e.g., to be communicated uphole) into the pulse-width-modulated signal generated by the motor controller (e.g., for toggling the switch). For example, a telemetry subsystem of the well tool can encode data, such as sensor data, into the pulse-width-modulated signal by modifying a position, an amplitude, or both of the pulses. The motor controller can transmit the modified pulse-width-modulated signal to the switch, which can toggle between positions based on the characteristics of the modified pulse-width-modulated signal. This can operate the motor at a desired speed, with a desired amount of torque, or both. This can additionally or alternatively generate current spikes on the wireline. Because the current spikes can include characteristics based on (e.g., that mimic) the characteristics of the modified pulse-width-modulated signal, the current spikes can include the encoded data. The current spikes can propagate up the wireline to a surface of the wellbore, where the data can be extracted from the current spikes. Thus, in some examples, the well tool can substantially simultaneously operate the motor in a particular manner (e.g., maintain a speed or torque of the motor) and communicate data uphole.

The current spikes can be detected at the well surface via a telemetry subsystem. For example, the telemetry subsystem can include a power spike detector (e.g., an ammeter coupled in series with the wireline) and a computing device. The power spike detector can detect the current spikes and transmit signals associated with the current spikes to the computing device. In some examples, the computing device can determine the data encoded in the current spikes based on the signals from the power spike detector. The computing device can provide the data to a well operator or perform another task based on the data.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a hydrocarbon extraction well system 100 that includes a subsystem for implementing downhole telemetry using motor current spikes according to some aspects. The hydrocarbon extraction well system 100 includes a wellbore 102 extending through various earth strata. The wellbore 102 extends through a hydrocarbon bearing subterranean formation 104. A casing string 106 extends from the well surface 108 to the subterranean formation 104. The casing string 106 can provide a conduit through which formation fluids, such as production fluids produced from the subterranean formation 104, can travel from the wellbore 102 to the well surface 108. The casing string 106 can be coupled to the walls of the wellbore 102 via cement. For example, a cement sheath can be positioned or formed between the casing string 106 and the walls of the wellbore 102 for coupling the casing string 106 to the wellbore 102.

The hydrocarbon extraction well system 100 can include at least one well tool 114 (e.g., a formation-testing tool). The well tool 114 can be coupled to a wireline 110 deployed into the wellbore 102 using, for example, a guide 112 or winch. The wireline 110 can be coupled to a power source 128 for providing power to the well tool 114. In some examples, the power source 128 can be positioned aboveground or belowground and near the well surface 108. The wireline 110 can additionally or alternatively act as a communication channel between the well tool 114 and the well surface 108.

In some examples, the well tool 114 can include a motor 118. The well tool 114 can operate the motor 118 to perform one or more well operations in the wellbore 102. In one example, the well tool 114 can include a tractor and use the motor 118 to pull the well tool 114 along a section of the wellbore 102. As another example, the well tool can include an anchor and use the motor 118 to generate a force for anchoring the well tool 114 in a fixed position in the wellbore 102.

In some examples, the well tool 114 can include a switch 120 (e.g., a control switch), a motor controller 122, or both for controlling operation of the motor 118. For example, the well tool 114 can include the motor controller 122 and the switch 120. The switch 120 can be electrically coupled between the wireline 110 (and thus the power source 128) and the motor 118. The motor controller 122 can toggle the switch 120 to cause the motor to run at a desired speed, with a desired amount of torque, or both. For example, the motor controller 122 can transmit an input signal (e.g., a pulse-width-modulated signal) to the switch 120. The input signal can include a pattern of pulses configured to toggle the switch 120 between operational modes (e.g., a closed state and an open state). When in one operational mode, the switch 120 can electrically couple the motor 118 to the power source 128, allowing the motor 118 to draw power from the power source 128. The power can drive the motor 118. When in another operational mode, the switch 120 can electrically decouple the motor 118 from the power source 128, preventing the motor 118 from drawing power from the power source 128. Thus, toggling the input signal between operational modes can control a speed, torque, or both of the motor 118. In some examples, the motor controller 122 can toggle the switch 120 between operational modes with a particular frequency, duty cycle, or both to drive the motor 118 in a desired manner (e.g., at a desired speed, such as for performing a desired well operation). For example, the motor controller 122 can transmit an input signal that includes a predetermined frequency, duty cycle, or both to the switch 120 to toggle the switch 120 in a manner configured to drive the motor 118 at a predetermined speed.

Figure 12A:
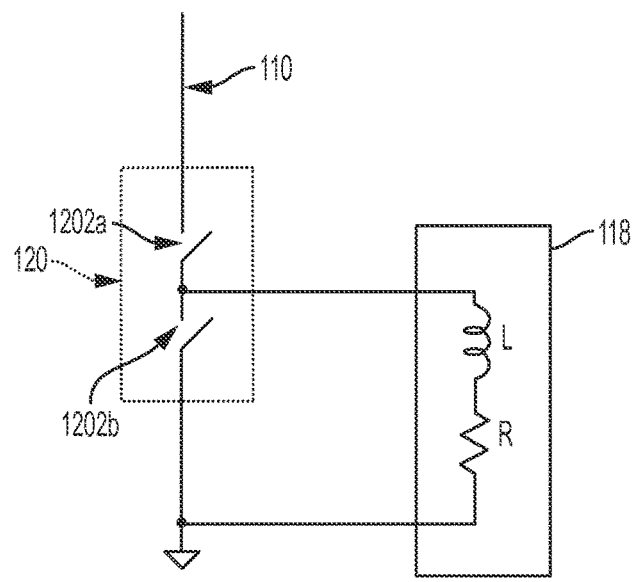
FIG. 12A is an example of a switch configuration according to some aspects.
Figure 12B:
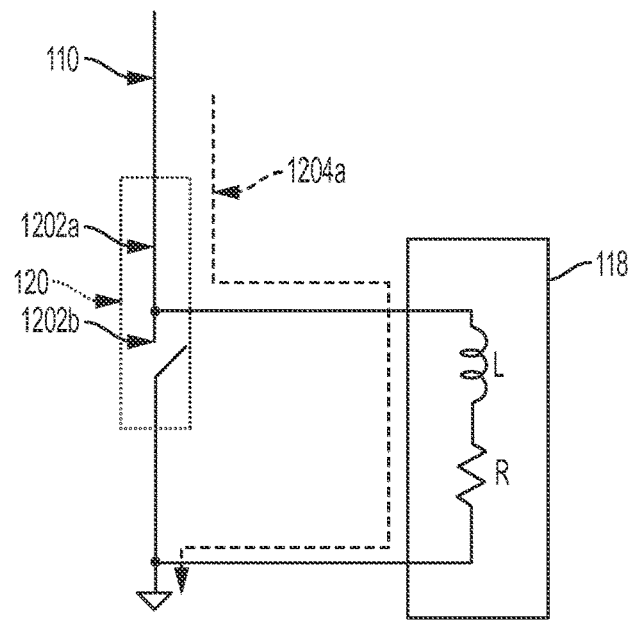
FIG. 12B is an example of another switch configuration according to some aspects.
Figure 12C:
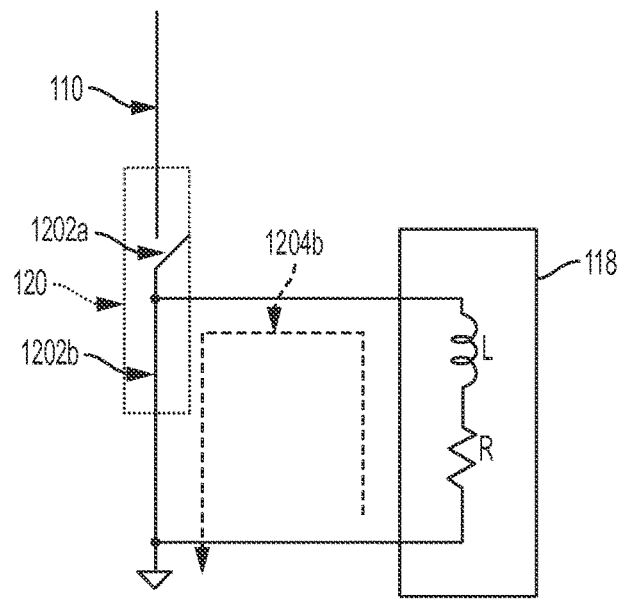
FIG. 12C is an example of another switch configuration according to some aspects.

In some examples, the switch 120 can include multiple switches. For example, as shown in FIG. 12A, the motor 118 can be represented as an inductor L in series with a resistor R, and the switch 120 can include two switches 1202a-b. The motor controller can transmit input signals to the switches 1202a-b (e.g., substantially simultaneously) for controlling a speed, torque, or both of the motor 118. In some examples, the input signals can be inverses of one another. For example, the motor controller can transmit an input signal with the pulse pattern 10101 to switch 1202a, where a 1 can represent a current pulse and a 0 can represent no current pulse. The motor controller can transmit another input signal with a pulse pattern 01010 to switch 1202b. Each 1 can cause a respective switch 1202a-b to toggle to a closed state, and each 0 can cause a respective switch 1202a-b to toggle to an open state. For example, if a 1 is transmitted to switch 1202a and a 0 is transmitted to switch 1202b, the switches 1202a-b can have the configuration shown in FIG. 12B. As shown in FIG. 12B, switch 1202a is in a closed state, switch 1202b is in an open state, and current 1204a can flow from the wireline 110 through the motor 118 to electrical ground. If a 0 is transmitted to switch 1202a and a 1 is transmitted to switch 1202b, the switches 1202a-b can have the configuration shown in FIG. 12C. As shown in FIG. 12C, switch 1202a is in an open state, switch 1202b is in a closed state, and current 1204b (e.g., stored in the inductor L) can flow from the motor 118 to electrical ground.

Referring back to FIG. 1, in some examples, toggling the switch 120 (e.g., switches 1202a-b of FIG. 12A) between operational modes can cause the motor 118 to draw power from the power source 128. This can generate current spikes in the wireline 110. The current spikes can make it challenging to use the wireline 110 for other purposes besides power transmission, such as for communicating data between the well tool 114 and the well surface 108. For example, it can be challenging to transmit data from the well tool 114 to the well surface 108 via the wireline 110, because the current spikes generated by the motor 118 can distort the data. This can render the data irretrievable or otherwise inaccurate. Thus, such current spikes were traditionally regarded as noise to be reduced or entirely eliminated from the wireline 110.

In some examples, the hydrocarbon extraction well system 100 can include a subsystem (e.g., subsystem 200 of FIG. 2) that can take advantage of the current spikes to communicate data between the well tool 114 and the well surface 108. For example, the well tool 114 can include a downhole telemetry subsystem 116 for communicating data to an uphole telemetry subsystem 140 via the wireline 110. In some examples, the downhole telemetry subsystem 116 can manipulate the characteristics of the current spikes to transmit data encoded in the current spikes to the uphole telemetry subsystem 140 via the wireline 110. This is described in greater detail with respect to FIG. 2. In some examples, the uphole telemetry subsystem 140 can be positioned farther uphole in the wellbore 102 than the downhole telemetry subsystem 116, but below the well surface 108.

For example, the uphole telemetry subsystem 140 can be positioned in another well tool in the wellbore 102 that is located farther uphole than the well tool 114.

In some examples, the downhole telemetry subsystem 116 can communicate sensor data to the uphole telemetry subsystem 140 via the wireline 110. For example, the well tool 114 can include one or more sensors 126. Examples of the sensors 126 can include a temperature sensor, pressure sensor, vibration sensor, acoustic sensor (e.g., a microphone), strain gauge, flow sensor, tilt sensor, accelerometer, gyroscope, inclinometer, or any combination of these. The one or more sensors 126 can be in communication with the downhole telemetry subsystem 116. The downhole telemetry subsystem 116 can receive sensor data from the one or more sensors 126. The downhole telemetry subsystem 116 can encode the sensor data in current spikes generated by the motor to transmit the sensor data to the uphole telemetry subsystem 140 via the wireline 110. In some examples, the downhole telemetry subsystem 116 can encode other data, such as data indicating an operational status of the well tool 114, in the current spikes to transmit the other data to the uphole telemetry subsystem 140.

Figure 2:
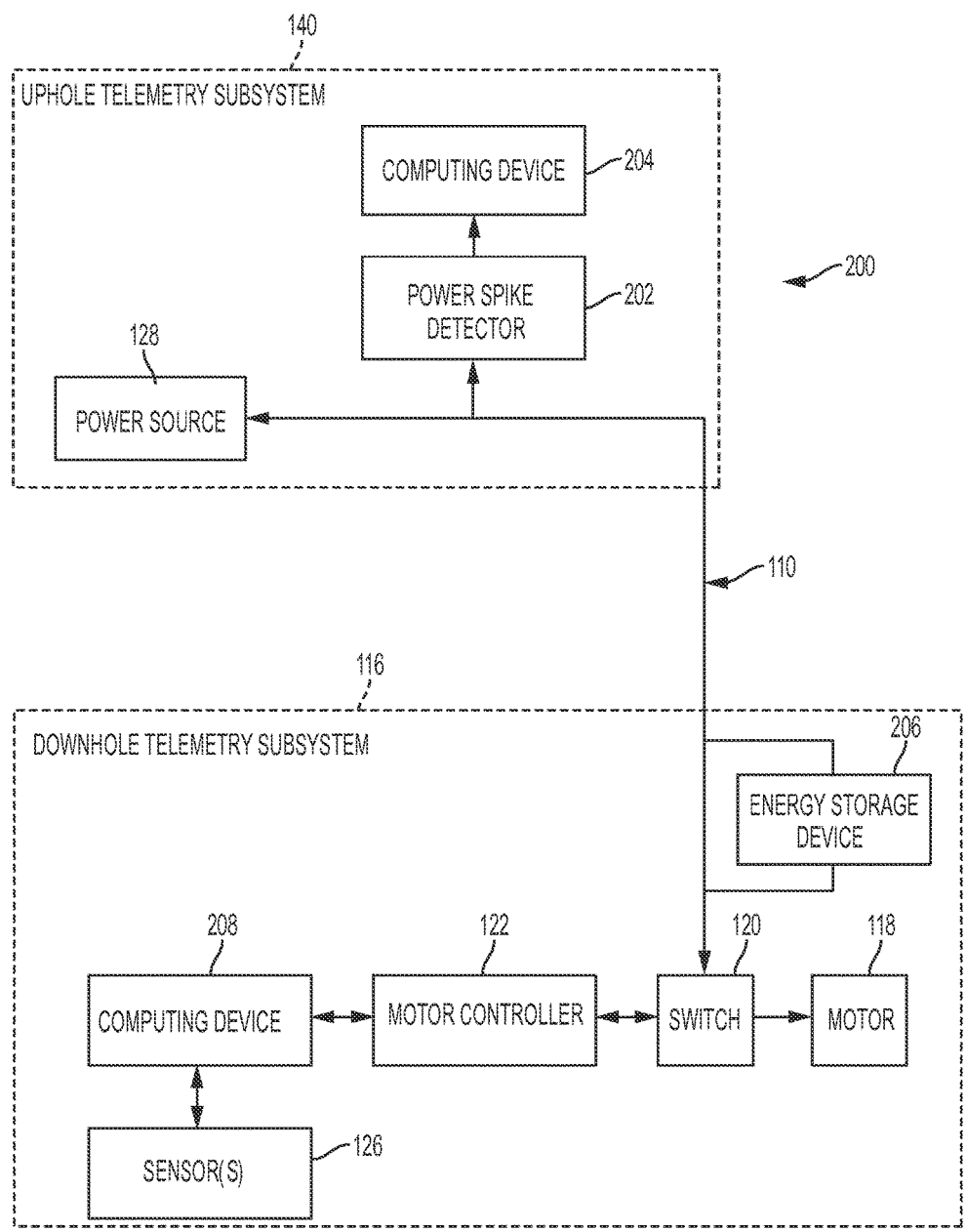
FIG. 2 is a block diagram of a subsystem for implementing downhole telemetry using motor current spikes according to some aspects.

FIG. 2 is a block diagram of a subsystem 200 for implementing downhole telemetry using motor current spikes according to some aspects. The subsystem 200 can include an uphole telemetry subsystem 140 in electrical communication with a downhole telemetry subsystem 116 via a wireline 110. In some examples, the downhole telemetry subsystem 116 can be part of, or included within, a well tool.

The uphole telemetry subsystem 140 can include, or can be in electrical communication with, a power source 128, a power spike detector 202, a computing device 204, or any combination of these. In some examples, the power source 128 can include a direct current (DC) power source or an alternating current (AC) power source. The power source 128 can supply power to the downhole telemetry subsystem 116, such as to one or more components of the downhole telemetry subsystem 116 (e.g., the motor 118).

In some examples, the power spike detector 202 can include an ammeter, a voltmeter, a transformer, or any combination of these. The power spike detector 202 can be electrically coupled in series or in parallel with the wireline 110. For example, the power spike detector 202 can include an ammeter coupled in series with the wireline 110. The power spike detector 202 can detect one or more power spikes in the wireline 110 (e.g., due to power draw from the motor 118). For example, the power spike detector 202 can detect a change in current, a change in voltage, or both associated with the wireline 110. The change in current, voltage, or both can indicate a power spike. In some examples, the power spike detector 202 can transmit signals associated with one or more detected power spikes to the computing device 204.

The computing device 204 can receive one or more signals from the power spike detector 202. The computing device 204 can analyze the signals to determine data associated with the signals. For example, the computing device 204 can analyze the signals to detect a series of power spikes. The computing device 204 can analyze the characteristics of the power spikes to determine data encoded in the power spikes (e.g., as discussed in greater detail below). In some examples, the computing device 204 can provide the data to a well operator (e.g., via a display, a printer, etc.), perform a function based on the data, or both. An example of the computing device 204 is described below with respect to FIG. 9.

The downhole telemetry subsystem 116 can include, or can be in electrical communication with, a motor controller 122, a switch 120 (e.g., a control switch), a motor 118, or any combination of these. In some examples, the motor controller 122 can include the switch 120. The motor controller 122 can transmit an input signal to the switch 120 (e.g., a brushless DC switch) to operate the switch 120. The switch 120 can receive the input signal and toggle between at least two operational modes based on the input signal (e.g., the characteristics of the input signal). In some examples, the motor 118 can draw power from the power source 128 in response to the switch 120 entering a particular operational mode. This can generate one or more current spikes in the wireline 110. The characteristics (e.g., frequency, waveform, duty cycle, timing, or any combination of these) of the current spikes can be based on the input signal from the motor controller 122.

Figure 3:
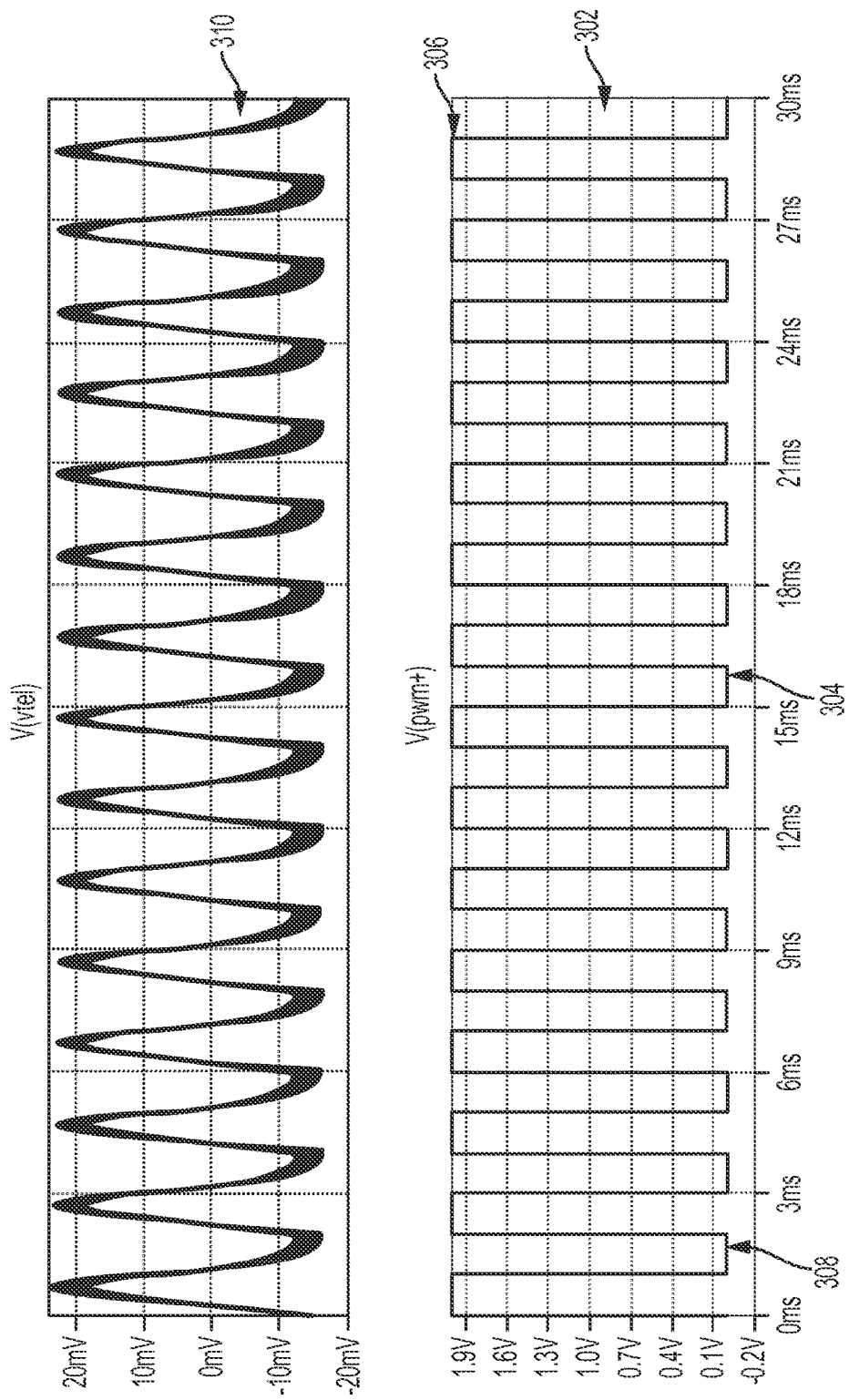
FIG. 3 shows a graph of an input signal provided to a switch for controlling a motor that includes a 50% duty cycle and a frequency of 500 hertz (Hz), and another graph of corresponding current spikes generated by the motor according to some aspects.

For example, referring to FIG. 3, graph 302 can show an input signal 304 transmitted by the motor controller to the switch for operating the switch. The input signal 304 can include a series of pulses. In some examples, the input signal 304 can include a 50% duty cycle and a frequency of 500 hertz (Hz). The input signal 304 can include at least two different amplitudes (e.g., a low amplitude 308 and a high amplitude 306) for toggling the switch between operational modes. For example, the switch can enter one operational mode in response to the input signal 304 having a low amplitude 308 and another operational mode in response to the input signal 304 having a high amplitude 306. Graph 310 can show current spikes generated in a wireline in response to the switch toggling between operational modes based on the input signal 304. As shown, the characteristics of the current spikes can be based on, and closely correlate with, the properties of the input signal 304.

Figure 4:
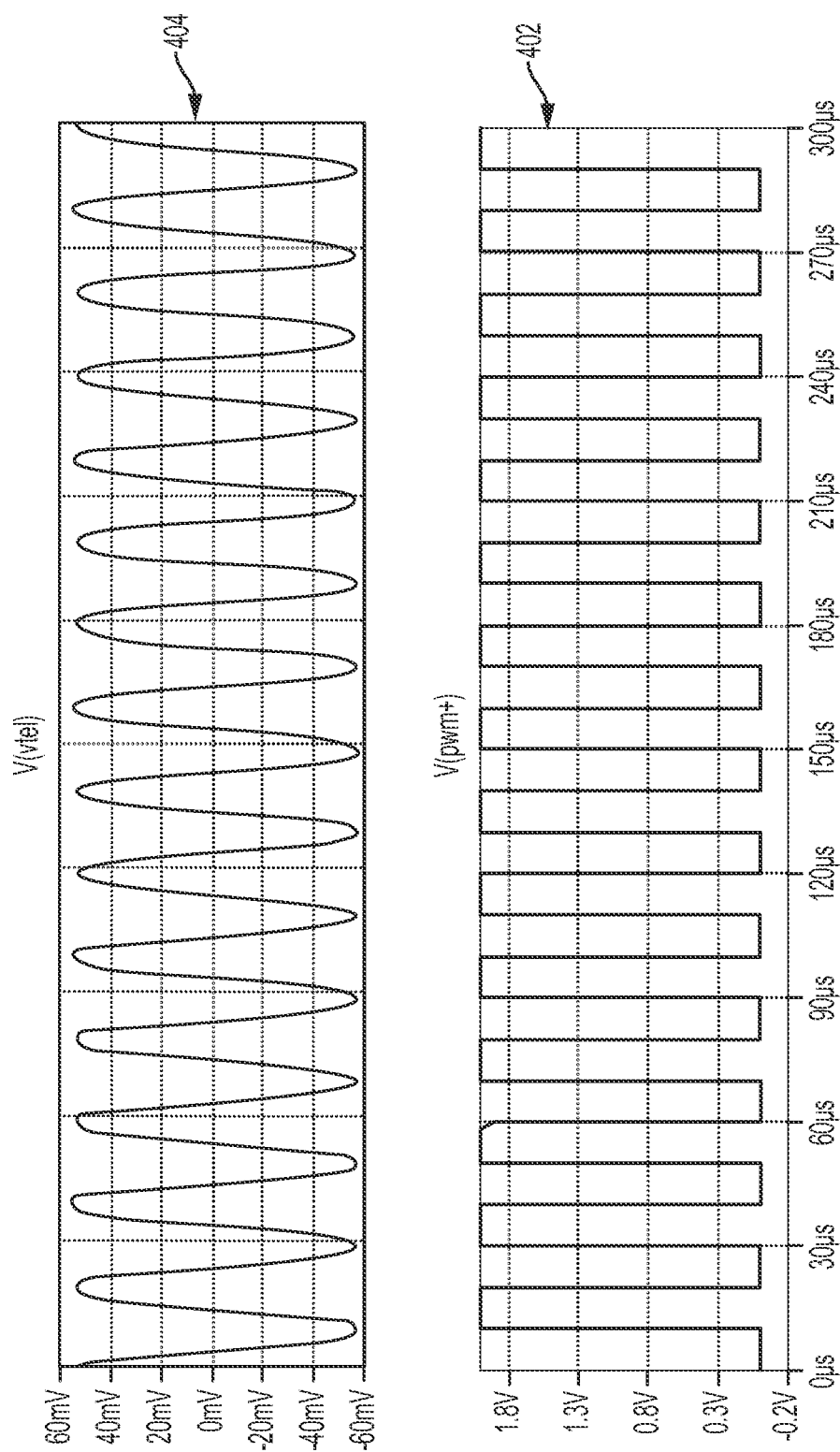
FIG. 4 shows a graph of an input signal provided to a switch for controlling a motor that includes a 50% duty cycle and a frequency of 50 kilohertz (kHz), and another graph of corresponding current spikes generated by the motor according to some aspects.
Figure 5:
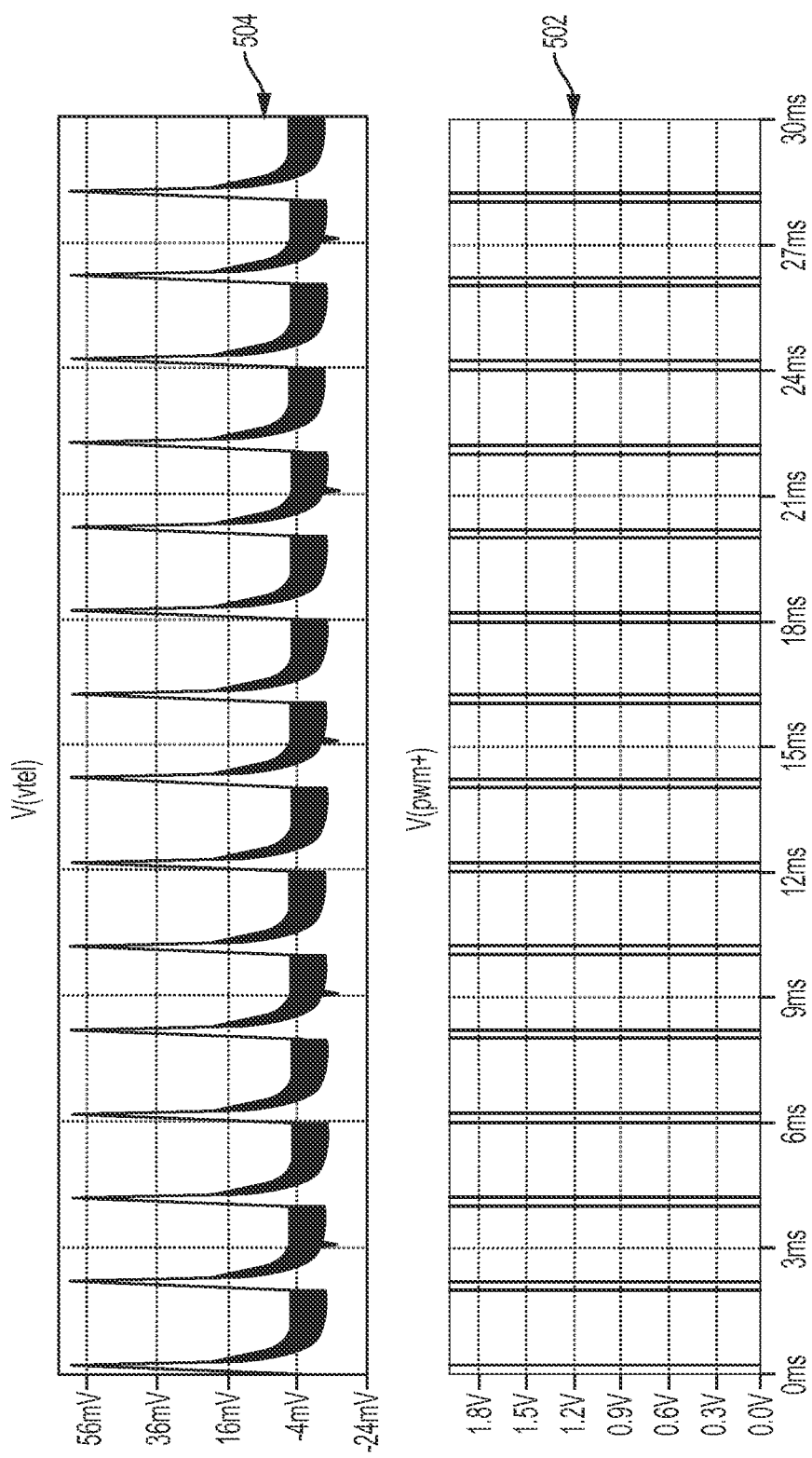
FIG. 5 shows a graph of an input signal provided to a switch for controlling a motor that includes a 10% duty cycle and a frequency of 500 Hz, and another graph of corresponding current spikes generated by the motor according to some aspects.
Figure 6:
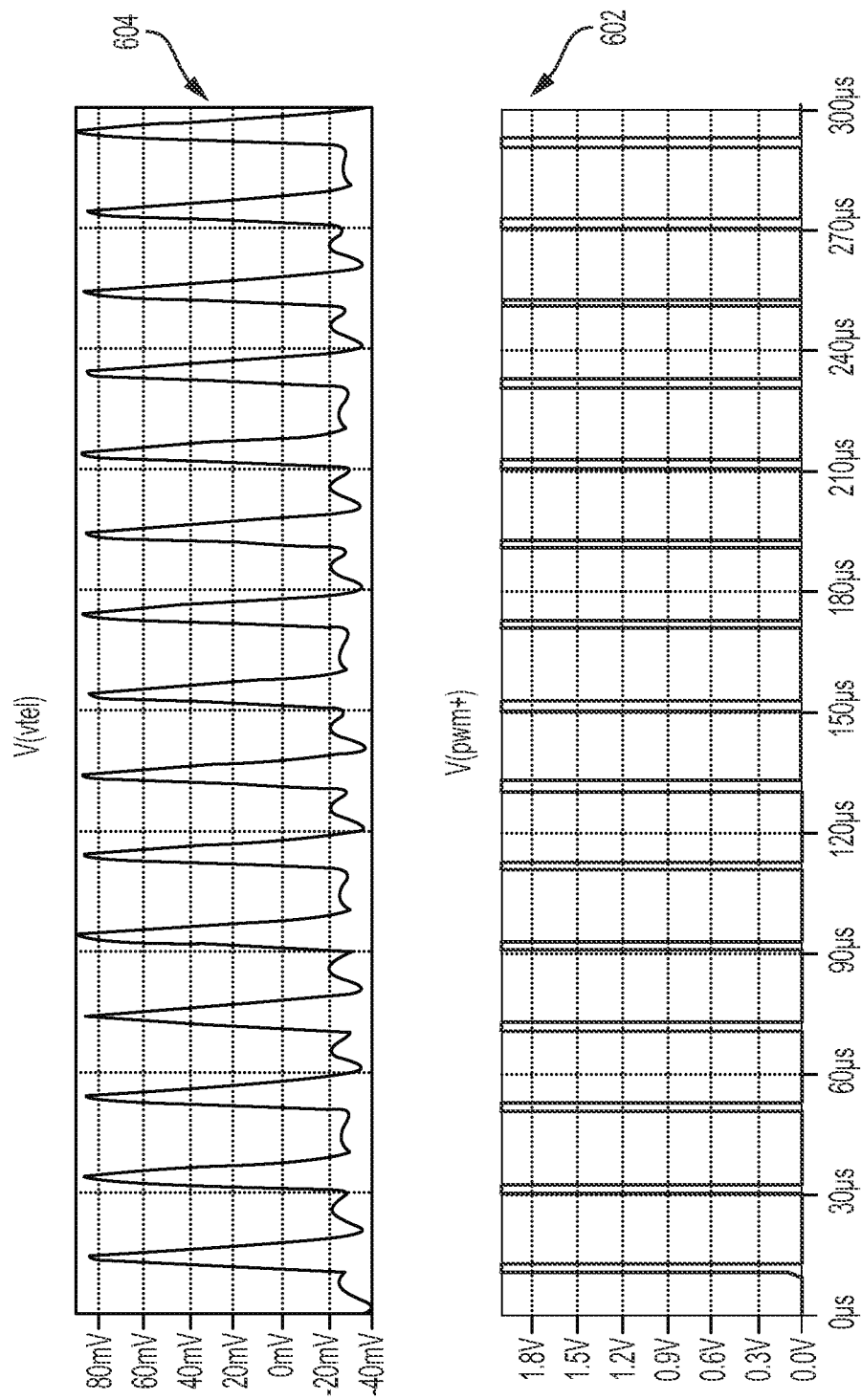
FIG. 6 shows a graph of an input signal provided to a switch for controlling a motor that includes a 10% duty cycle and a frequency of 50 kHz, and another graph of corresponding current spikes generated by the motor according to some aspects.

As another example, referring to FIG. 4, graph 402 can show another input signal transmitted by the motor controller to the switch for operating the switch. The input signal can include a 50% duty cycle and a frequency of 50 kilohertz (kHz). Graph 404 can show current spikes generated in a wireline in response to the switch toggling between operational modes based on the input signal. As still another example, referring to FIG. 5, graph 502 can show another input signal for operating the switch that can include a 10% duty cycle and a frequency of 500 Hz. Graph 504 can show current spikes generated in the wireline in response to the switch toggling between operational modes based on the input signal. As yet another example, referring to FIG. 6, graph 602 can show another input signal for operating the switch that can include a 10% duty cycle and a frequency of 50 kHz. Graph 604 can show current spikes generated in the wireline in response to the switch toggling between operational modes based on the input signal. The characteristics of the current spikes can be based on, and closely correlate with, the properties of the input signal.

Referring back to FIG. 2, in some examples, the motor controller 122 can generate an input signal that includes encoded data (e.g., for transmission to the switch 120). For example, the motor controller 122 can encode data from one or more sensors 126 into the input signal. In some examples, the sensors 126 may be directly coupled to the motor controller 122 for communicating sensor data to the motor controller 122. In other examples, the sensors 126 can communicate sensor data to a computing device 208, which in turn can communicate the sensor data to the motor controller 122. The motor controller 122 can receive the sensor data and encode the sensor data in the input signal. In some examples, the motor controller 122 can transmit the input signal that includes the encoded data to the switch 120. This can cause the switch 120 to toggle between operational modes and thereby generate current spikes in the wireline 110. Because the characteristics of the current spikes can be similar to the characteristics of the input signal from the motor controller 122, the current spikes can include the encoded data.

Figure 7:
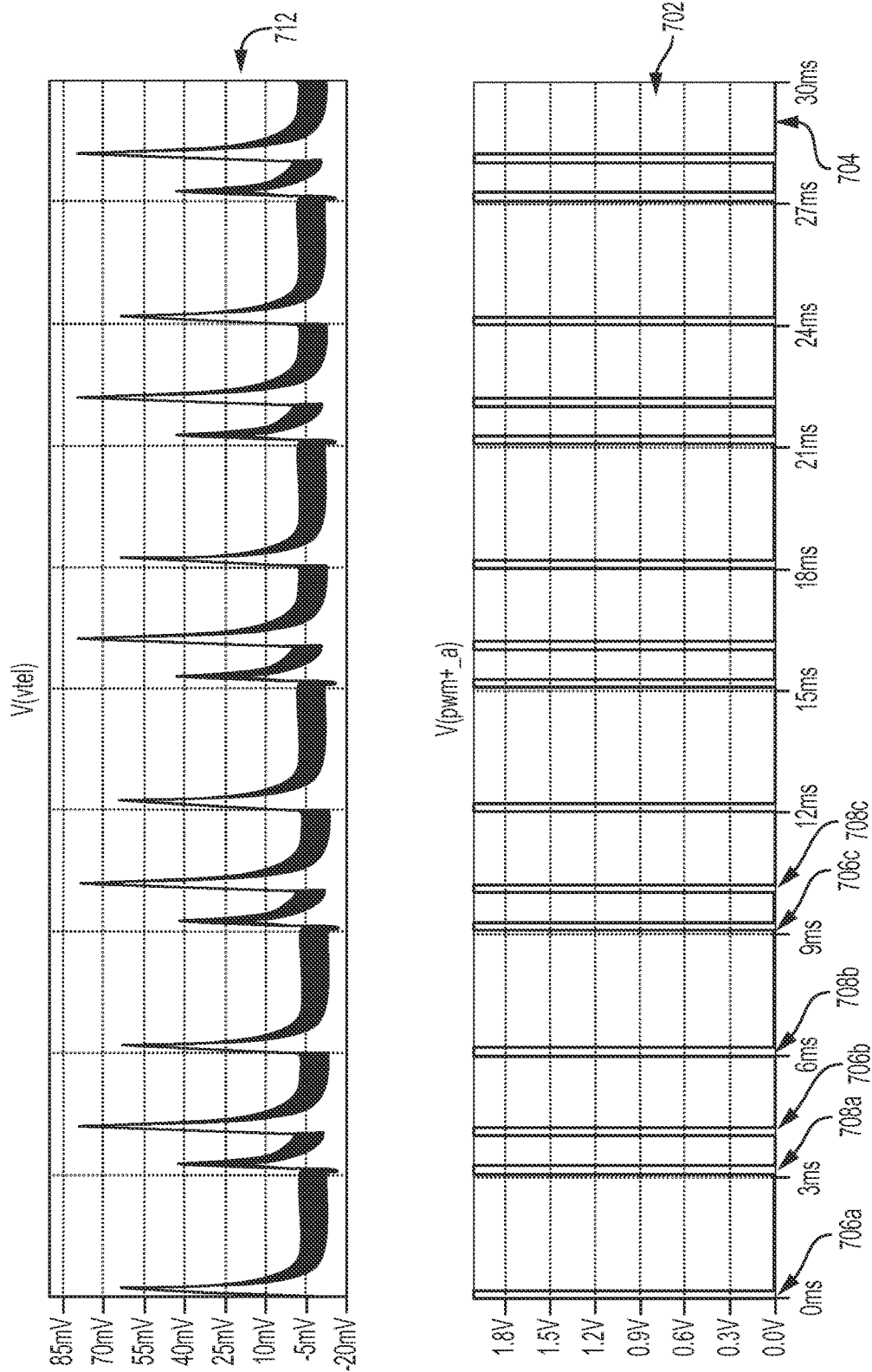
FIG. 7 shows a graph of an encoded input signal provided to a switch for controlling a motor that includes a 10% duty cycle and a frequency of 500 Hz, and another graph of corresponding current spikes generated by the motor according to some aspects.

For example, referring to FIG. 7, graph 702 can show an input signal 704 transmitted by a motor controller to a switch for operating the switch. The input signal 704 can include a 10% duty cycle and a frequency of 500 Hz. In some examples, the input signal 704 can include encoded data. For example, data can be encoded in the input signal 704 according to a pulse-width-modulation (PWM) encoding scheme. Pulse-width-modulation can include encoding one or more bits of information in a series of pulses by spacing the pulses at particular intervals, where each interval corresponds to a particular bit of data. In the example shown in FIG. 7, input signal 704 can include reference pulses 706a-c, which can serve as a reference point for use in decoding. Input signal 704 can also include pulses 708a-c for encoding data. For example, a large space between reference pulse 706a and pulse 708a can indicate a "1" bit, and a small space between reference pulse 706b and pulse 708b can indicate a "0" bit. Graph 712 can show current spikes generated in a wireline as a result of the switch toggling between operational modes based on the input signal 704. The current spikes can include the pulse-width-modulated encoded data.

Figure 8:
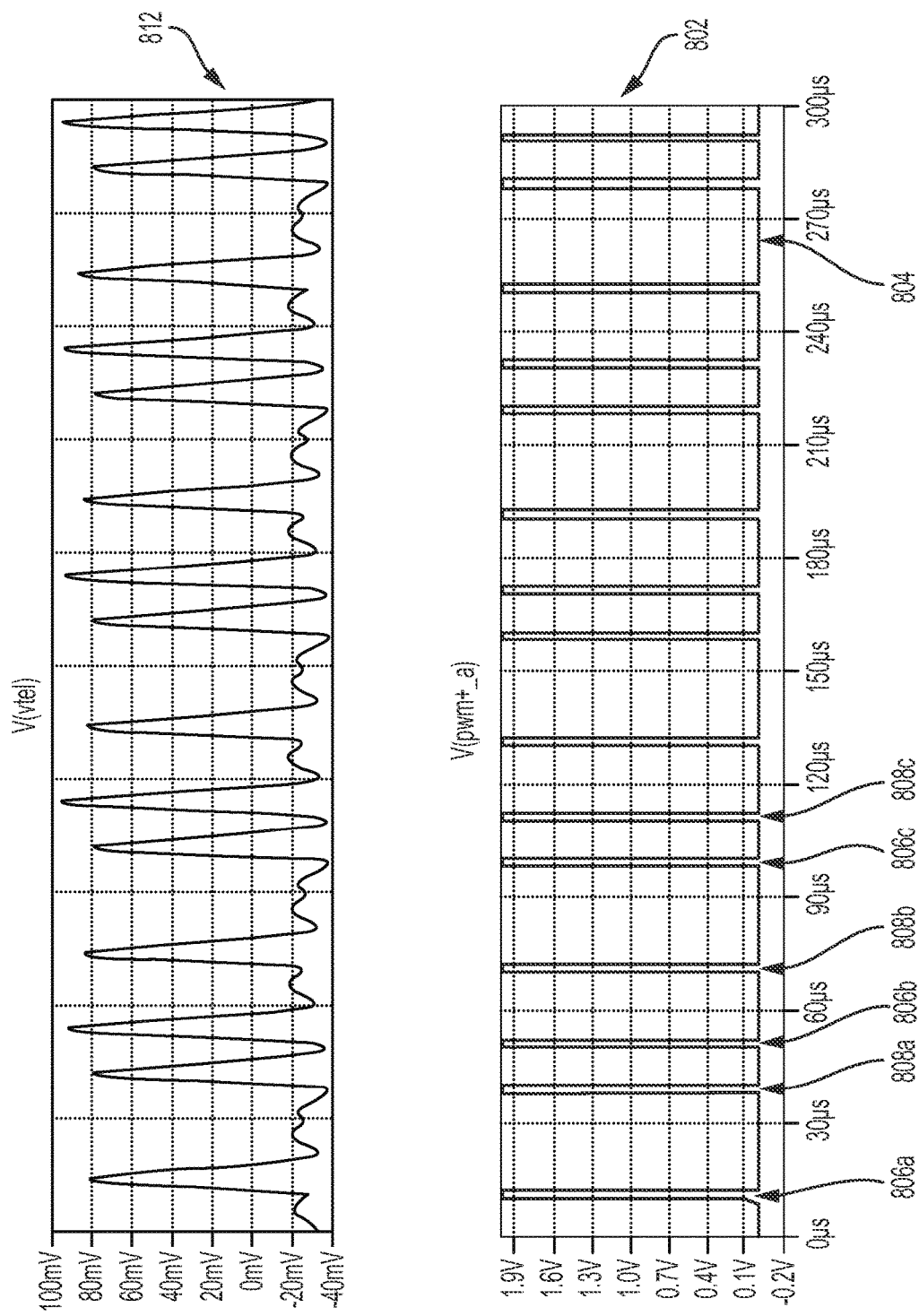
FIG. 8 is a graph of an encoded input signal provided to a switch for controlling a motor that includes a 10% duty cycle and a frequency of 50 kHz, and another graph of corresponding current spikes generated by the motor according to some aspects.

As another example, referring to FIG. 8, graph 802 can show an input signal 804 transmitted by a motor controller to a switch for operating the switch. The input signal 804 can include a 50% duty cycle and a frequency of 50 kHz. The input signal 804 can include a series of pulses encoded with data according to a pulse-width-modulation scheme. For example, a large space between reference pulse 806a and pulse 808a can indicate a "1" bit, a small space between reference pulse 806b and pulse 808b can indicate a "0" bit, and another small space between reference pulse 806c and pulse 808c can indicate a "0" bit. In some examples, every other pulse of the input signal 804 can include a reference pulse 806a-c, which can serve as a reference point for use in decoding. Graph 812 can show current spikes generated in the wireline 110 as a result of the switch 120 toggling between operational modes based on the input signal 804. The current spikes can include the pulse-width-modulated encoded data.

Referring back to FIG. 2, the motor controller 122 can additionally or alternatively configure the characteristics of the input signal to cause the motor 118 to operate at a desired speed, such as to perform a well operation. For example, the motor controller 122 can modulate the widths (e.g., duty cycles) of a series of pulses of an input signal that is encoded with data to drive the motor 118 at a desired speed. In such an example, the downhole telemetry subsystem 116 can substantially simultaneously operate the motor 118 in a desired manner and transmit encoded data via current spikes. For example, the downhole telemetry subsystem 116 can substantially simultaneously drive the motor 118 at a constant speed while transmitted encoded data via current spikes uphole.

In some examples, the downhole telemetry subsystem 116 can include, or can be in electrical communication with, other components. For example, the downhole telemetry subsystem 116 can include an energy storage device 206. The energy storage device 206 can include one or more capacitors (e.g., shunt capacitors). The energy storage device 206 can be electrically coupled in parallel with the wireline 110. In some examples, the characteristics of the energy storage device 206 can impact one or more characteristics (e.g., a timing, amplitude, waveform, duration, frequency, or any combination of these) of the current spikes generated by the motor 118. For example, the current spikes can include a smaller amplitude if the energy storage device 206 includes a higher-farad capacitor, and a larger amplitude if the energy storage device 206 includes a lower-farad capacitor. In some examples, the energy storage device 206 can limit rush currents and allow the motor 118 to operate properly.

In some examples, the downhole telemetry subsystem 116 can include, or can be in electrical communication with, a computing device 208. The computing device 208 can be configured substantially the same as, or different from, the computing device 204. For example, the computing device 208 can be configured as described with respect to FIG. 9, which is discussed in greater detail below. In some examples, the computing device 208 can include the motor controller 122, or vice-versa.

The computing device 208 can determine data to transmit to the uphole telemetry subsystem 140 (e.g., via the wireline 110). For example, the computing device 208 can determine data to transmit to the uphole telemetry subsystem 140 based on sensor signals from one or more sensors 126. In some examples, the computing device 208 can encode the data and provide the encoded data to the motor controller 122. For example, the computing device 208 can transmit encoded data to the motor controller 122 for use, at least in part, in generating an input signal for operating the switch 120. The motor controller 122 can receive the encoded data and generate the input signal based at least in part on the encoded data. The motor controller 122 can transmit the input signal to the switch 120, which can operate the motor 118 in an arrangement configured to generate current spikes that include the encoded data.

In some examples, the downhole telemetry subsystem 116 can include, or can be in electrical communication with, the sensors 126. The sensors 126 can detect various characteristics of a well tool or a wellbore environment. For example, the sensors 126 can detect a temperature, pressure, tension, motor speed, acceleration, orientation, inclination, or any combination of these. The sensors 126 can transmit sensor signals associated with the characteristics to the computing device 208, the motor controller 122, or both. The computing device 208, the motor controller 122, or both can receive the sensor signals and, in some examples, cause the downhole telemetry subsystem 116 to transmit the characteristics to the uphole telemetry subsystem 140 in the form of current spikes encoded with data.

In some examples, the downhole telemetry subsystem 116 can be deployed in a wellbore. The downhole telemetry subsystem 116 can determine data to transmit uphole, and encode the data at least in part within current spikes generated by the motor 118. The current spikes can be communicated to the uphole telemetry subsystem 140 via the wireline 110. The uphole telemetry subsystem 140 can detect the current spikes (e.g., via the power spike detector 202), analyze the current spikes (e.g., via the computing device 204), and determine the data encoded in the current spikes. In some examples, the uphole telemetry subsystem 140 can provide the data to the well operator, can perform a function based on the data, or both.

Figure 9:
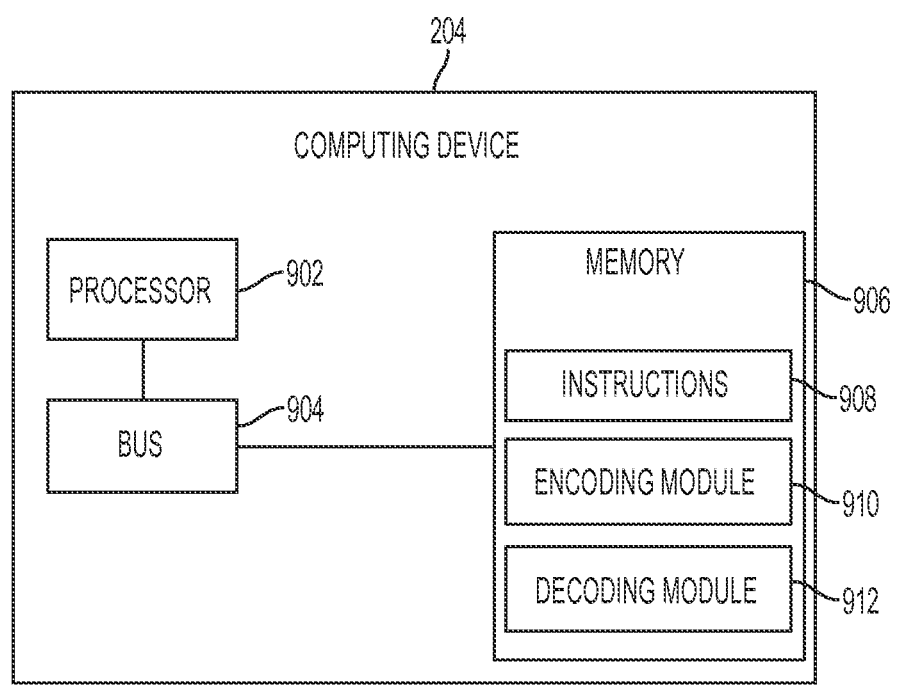
FIG. 9 is a block diagram of a computing device for implementing downhole telemetry using motor current spikes according to some aspects.

FIG. 9 is a block diagram of a computing device 204 for implementing downhole telemetry using motor current spikes according to some aspects. In some examples, the components shown in FIG. 9 (e.g., the processor 902, bus 904, and memory 906) can be integrated into a single structure. For example, the components can be within a single housing. In other examples, the components shown in FIG. 9 can be distributed (e.g., in separate housings) and in electrical communication with each other.

The processor 902 can execute one or more operations for implementing downhole telemetry using motor current spikes. The processor 902 can execute instructions 908 stored in the memory 906 to perform the operations. The processor 902 can include one processing device or multiple processing devices. Non-limiting examples of the processor 902 include a Field-Programmable Gate Array ("FPGA"), an application-specific integrated circuit ("ASIC"), a microprocessor, etc.

The processor 902 can be communicatively coupled to the memory 906 via the bus 904. The non-volatile memory 906 may include any type of memory device that retains stored information when powered off. Non-limiting examples of the memory 906 include electrically erasable and programmable read-only memory ("EEPROM"), flash memory, or any other type of non-volatile memory. In some examples, at least some of the memory 906 can include a medium from which the processor 902 can read instructions 908. A computer-readable medium can include electronic, optical, magnetic, or other storage devices capable of providing the processor 902 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 902 can read instructions 908. The instructions 908 can include processor-specific instructions generated by a compiler or an interpreter from code written in any suitable computer-programming language, including, for example, C, C++, C#, etc.

In some examples, the computing device 204 can include an encoding module 910. The encoding module 910 can encode data (e.g., sensor data) according to one or more encoding schemes. Examples of encoding schemes can include pulse-width modulation, frequency modulation, etc. For example, the encoding module 910 can receive sensor data and encode the sensor data in a signal according to a pulse-width-modulation scheme.

In some examples, the computing device 204 can include a decoding module 912. The decoding module 912 can receive signals associated with encoded data (e.g., signals associated with current spikes encoded with data) and decode the encoded data. For example, the decoding module 912 can receive signals from a power spike detector (e.g., power spike detector 202 of FIG. 2). The signals can be associated with a series of current spikes that include encoded data. The decoding module 912 can analyze the signals from the power spike detector to determine the characteristics of the current spikes. In some examples, the decoding module 912 can extract, or otherwise determine, the data encoded within the current spikes based on the characteristics of the current spikes.

The computing device 204 can additionally or alternatively include other components. For example, the computing device 204 can include an input device, such as a keyboard, mouse, touch-screen display, touchpad, etc. In some examples, the input device can be coupled to the bus 904 for providing input to the processor 902. As another example, the computing device 204 can include an output device, such as a speaker, a display, or both. Examples of the display can include a computer monitor, a television, a touch-screen display, etc. In some examples, the computing device 204 can transmit audio signals or display signals to the output device to cause the output device to generate sound or an image, respectively. For example, the computing device 204 can transmit display signals to a display for causing the display to output data encoded within current spikes transmitted via a wireline.

Figure 10:
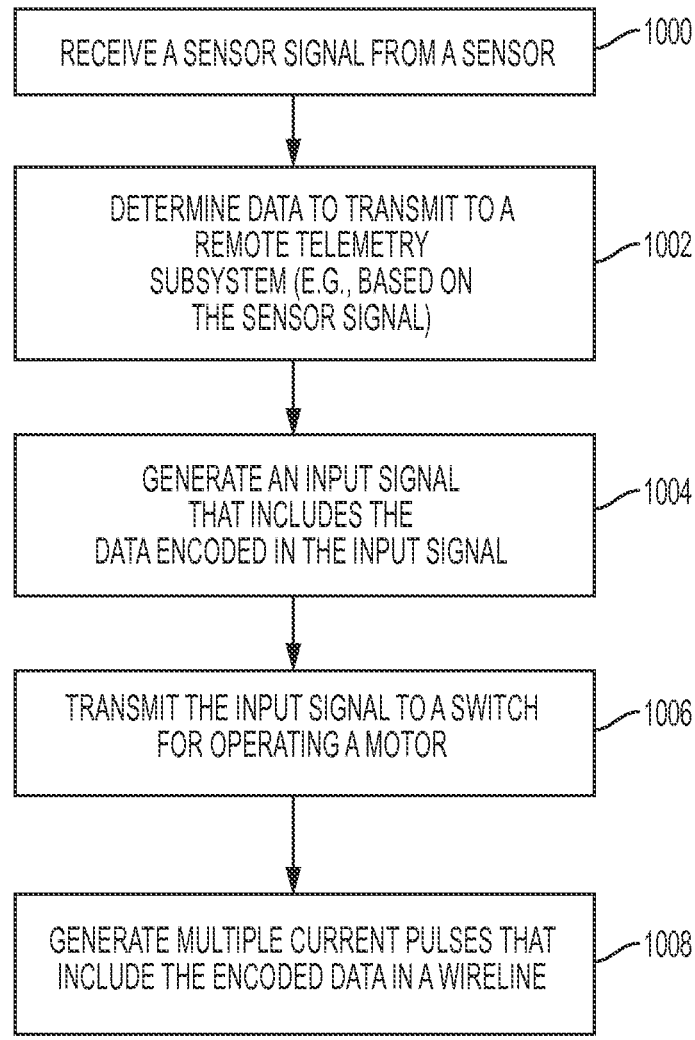
FIG. 10 is a flow chart of an example of a process for implementing downhole telemetry using motor current spikes according to some aspects.

FIG. 10 is a flow chart of an example of a process for implementing downhole telemetry using motor current spikes according to some aspects.

In block 1000, a telemetry subsystem (e.g., positioned on a well tool, such as a formation-testing tool) receives a sensor signal from a sensor. For example, a computing device (e.g., computing device 208 of FIG. 2) of the telemetry subsystem or a motor controller (e.g., motor controller 122 of FIG. 2) of the telemetry subsystem can receive the sensor signal from the sensor.

The telemetry subsystem can be electrically coupled to the sensor for receiving the sensor signal. The sensor signal can be in analog or digital form. In some examples, the sensor can detect one or more characteristics of a well tool or a wellbore environment and transmit associated sensor signals to the telemetry subsystem.

In block 1002, the telemetry subsystem determines data to transmit to a remote telemetry subsystem (e.g., positioned uphole). For example, a computing device of the telemetry subsystem can determine the data to transmit to the remote telemetry subsystem.

The telemetry subsystem can determine the data based on the sensor signals. For example, the telemetry subsystem can determine that the data to transmit to the remote telemetry subsystem includes sensor data encoded within or otherwise provided by the sensor signals. In other examples, the telemetry subsystem can determine that the data includes other information, such as an operational status of a well tool or a well tool component.

In block 1004, the telemetry subsystem generates an input signal that includes the data encoded in the input signal. The telemetry subsystem can generate the input signal based on an algorithm, a lookup table, an encoding scheme (e.g., a pulse-width modulation encoding scheme), or any combination of these. For example, the telemetry subsystem can generate the input signal at least in part by modulating a spacing between two or more pulses of the input signal according to a pulse-width modulation encoding scheme to encode the data in the input signal. The telemetry subsystem can additionally or alternatively configure the widths of the pulses in an arrangement for driving a motor at a desired speed, with a desired torque, or both. In some examples, the telemetry subsystem can refer to a lookup table or use an algorithm to determine the widths of the pulses for driving the motor at the desired speed.

In block 1006, the telemetry subsystem transmits the input signal to a switch for operating the motor. The switch can be coupled between the motor and a wireline connected to a power source. The switch can toggle between operational modes in response to the input signal, which can cause the motor to electrically couple to, and decouple from, the power source. The motor can draw power from the power source when the motor is electrically coupled to the power source. This can generate current pulses (e.g., spikes) in the wireline.

In block 1008, the telemetry subsystem generates multiple current pulses (e.g., a series of current pulses) in the wireline that include the data encoded in the input signal. For example, in response to the switch toggling between operational modes in an arrangement based on the input signal, the motor can draw power or stop drawing power from the power source. This can generate a series of current pulses in the wireline with characteristics that are substantially similar to, and correlate closely with, the input signal. Because the characteristics of the current pulses can correspond to the characteristics of the input signal, if the input signal includes the encoded data, the current pulses can also include the encoded data.

Figure 11:
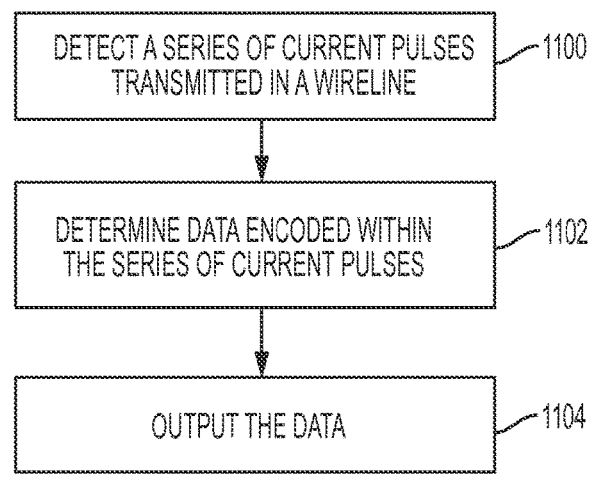
FIG. 11 is a flow chart of an example of another process for implementing downhole telemetry using motor current spikes according to some aspects.

FIG. 11 is a flow chart of an example of another process for implementing downhole telemetry using motor current spikes according to some aspects. The steps of FIG. 11 can be implemented additionally or alternatively to any of the steps shown in FIG. 10.

In block 1100, a telemetry subsystem detects a series of current pulses transmitted in a wireline. The telemetry subsystem can include a power spike detector for detecting the series of current pulses.

In some examples, the telemetry subsystem can be positioned at a surface of a wellbore. The telemetry subsystem can be coupled to the wireline for receiving data from another telemetry subsystem positioned downhole.

In block 1102, the telemetry subsystem determines data encoded within the series of current pulses. For example, the telemetry subsystem can include a computing device. The power spike detector can transmit signals associated with the current pulses to the computing device. The computing device can receive and analyze the signals. For example, the computing device can analyze the signals to determine data encoded within the current pulses. In some examples, the computing device can determine that the data is encoded within the current pulses using a pulse-width-modulation scheme and decode or otherwise extract the data from the current pulses.

In block 1104, the telemetry subsystem outputs the data (e.g., via a display device or a speaker). For example, the telemetry subsystem can transmit a display signal to a display of the telemetry subsystem. The display signal can cause the display to output the data. As another example, the telemetry subsystem can transmit an audio signal to a speaker of the telemetry subsystem. The audio signal can cause the speaker to output the data. As still another example, the telemetry subsystem can transmit a printer signal to a printer. The printer signal can cause a printer to print the data.

In some aspects, downhole telemetry using motor current spikes can be implemented according to one or more of the following examples:

Example #1

A well tool for use in a wellbore can include a motor for performing a well operation. The well tool can include a switch that is coupleable between the motor and a wireline. The switch can be toggleable between (i) a first operational state for providing the power to the motor by coupling the motor to an external power source and (ii) a second operational state for decoupling the motor from the external power source. The well tool can include a motor controller coupled to the switch for toggling the switch between the first operational state and the second operational state in an arrangement configured to impart, on the wireline, multiple current pulses including data encoded in the multiple current pulses according to an encoding scheme.

Example #2

The well tool of Example #1 may feature the encoding scheme including pulse-width-modulation, the well tool including a formation-testing tool, the external power source being positionable at a surface of the wellbore, or any combination of these.

Example #3

The well tool of any of Examples #1-2 may feature the arrangement of the toggling of the switch between the first operational state and the second operational state being configured to substantially simultaneously operate the motor at a predetermined speed for performing the well operation.

Example #4

The well tool of any of Examples #1-3 may feature the arrangement of the toggling of the switch between the first operational state and the second operational state being configured to substantially simultaneously maintain the motor at a predetermined speed for performing the well operation.

Example #5

The well tool of any of Examples #1-4 may feature the data encoded in the multiple current pulses being associated with a characteristic of the wellbore or the well tool.

Example #6

The well tool of any of Examples #1-5 may feature well tool including a sensor for detecting the characteristic of the wellbore or the well tool and transmitting a sensor signal associated with the characteristic. The well tool can include a first computing device coupled to the sensor for receiving the sensor signal from the sensor and transmitting sensor data associated with the sensor signal to the motor controller. The motor controller can be configured to receive the sensor data from the first computing device and generate an input signal based on the sensor data and the encoding scheme. The motor controller can be configured to transmit the input signal to the switch for toggling the switch between the first operational state and the second operational state in the arrangement configured to impart the multiple current pulses on the wireline.

Example #7

The well tool of any of Examples #1-6 may feature a capacitor coupled in parallel with the wireline for modifying an amplitude of at least one current pulse of the multiple current pulses.

Example #8

The well tool of any of Examples #1-7 may feature the well tool including a first telemetry subsystem. The first telemetry subsystem can include the sensor, the switch, the motor, the motor controller, the capacitor, the first computing device, or any combination of these. The wireline can be coupled to a second telemetry subsystem positioned at the surface of the wellbore for receiving the multiple current pulses from the first telemetry subsystem via the wireline, determining the data encoded in the multiple current pulses, and displaying the data.

Example #9

The well tool of Example #8 may feature the second telemetry subsystem including a power spike detector coupled to the wireline for detecting the multiple current pulses and transmitting signals associated with the multiple current pulses. The second telemetry subsystem can include a second computing device for receiving the signals from the power spike detector, determining the data encoded in the multiple current pulses based on the signals from the power spike detector, and displaying the data.

Example #10

A communication system for use in a wellbore can include a first telemetry subsystem positioned on a well tool. The first telemetry subsystem can include a first computing device. The first computing device can include a first processor, and a first memory in which instructions executable by the first processor are stored. The instructions can be for causing the first processor to receive a sensor signal from a sensor indicating a characteristic of the wellbore or the well tool. The instructions can be for causing the first processor to cause a motor controller to toggle a switch coupled between a motor and a power source in an arrangement based at least in part on an encoding scheme and configured to generate multiple current pulses representing the characteristic in a wireline.

Example #11

The communication system of Example #10 may feature a second telemetry subsystem positionable at a well surface. The second telemetry subsystem can include a power spike detector for detecting the multiple current pulses in the wireline and transmitting signals associated with the multiple current pulses. The second telemetry subsystem can include a second computing device coupled to the power spike detector. The second computing device can include a second processor, and a second memory in which instructions executable by the second processor are stored. The instructions can be for causing the second processor to receive the signals from the power spike detector. The instructions can be for causing the second processor to generate decoded data by decoding the multiple current pulses based on the signals from the power spike detector. The instructions can be for causing the second processor to determine the characteristic based on the decoded data.

Example #12

The communication system of any of Examples #10-11 may feature the first telemetry subsystem including the sensor coupled to the first computing device and the motor controller.

Example #13

The communication system of any of Examples #10-12 may feature the encoding scheme including pulse-width modulation, the well tool including a formation-testing tool, or both.

Example #14

The communication system of any of Examples #11-13 may feature the first telemetry subsystem including the switch and the motor, the second telemetry subsystem including power source, the first telemetry system being coupled to the wireline, the second telemetry system being coupled to the wireline, or any combination of these.

Example #15

The communication system of any of Examples #11-14 may feature the power spike detector including an ammeter, a voltmeter, or a transformer.

Example #16

The communication system of any of Examples #11-15 may feature the power spike detector including an ammeter coupled in series between the power source and the wireline. The first telemetry subsystem can include a capacitor coupled in parallel with the wireline for modifying an amplitude of at least one current pulse of the multiple current pulses.

Example #17

A method can include determining, by a first telemetry subsystem positioned on a well tool, data to transmit to a second telemetry subsystem. The method can include generating, by a motor controller of the first telemetry subsystem, an input signal including the data encoded in the input signal using an encoding scheme. The method can include transmitting, by the motor controller, the input signal to a switch coupled between a motor and a wireline connected to a power source. The method can include generating, by the switch and in response to the input signal, multiple current pulses in the wireline and including the data encoded in the input signal by electrically coupling and decoupling the motor to the power source in an arrangement based on the input signal.

Example #18

The method of Example #17 may feature the well tool including a formation-testing tool. The method may feature determining the data to transmit to the second telemetry subsystem by receiving a sensor signal from a sensor and determining the data based on the sensor signal.

Example #19

The method of any of Examples #17-18 may feature generating the input signal by modulating a spacing between two or more pulses of the input signal according to a pulse-width-modulation encoding scheme.

Example #20

The method of any of Examples #17-19 may feature detecting, by the second telemetry subsystem and via a power spike detector coupled to the wireline, the multiple current pulses. The method may feature transmitting, by the power spike detector, signals associated with the multiple current pulses to a computing device of the second telemetry subsystem. The method may feature receiving, by the computing device, the signals from the power spike detector. The method may feature determining, by the computing device, the data based on the signals from the power spike detector. The method may feature outputting, by the computing device, the data via a display device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well tool for use in a wellbore, the well tool comprising:
   a motor for performing a well operation;
   a switch coupleable between the motor and a wireline, the switch toggleable between (i) a first operational state for providing power to the motor by coupling the motor to an external power source and (ii) a second operational state for decoupling the motor from the external power source;
   a motor controller coupled to the switch for toggling the switch between the first operational state and the second operational state in an arrangement configured to impart, on the wireline, a plurality of current pulses comprising data encoded in the plurality of current pulses according to an encoding scheme.

2. The well tool of claim 1, wherein:
   the encoding scheme comprises pulse-width-modulation;
   the well tool comprises a formation-testing tool;
   the external power source is positionable at a surface of the wellbore.

3. The well tool of claim 2, wherein the arrangement of the toggling of the switch between the first operational state and the second operational state is configured to substantially simultaneously operate the motor at a predetermined speed for performing the well operation.

4. The well tool of claim 3, wherein the arrangement of the toggling of the switch between the first operational state and the second operational state is configured to substantially simultaneously maintain the motor at the predetermined speed for performing the well operation.

5. The well tool of claim 4, wherein the data encoded in the plurality of current pulses is associated with a characteristic of the wellbore or the well tool.

6. The well tool of claim 5, wherein the well tool further comprises:
   a sensor for detecting the characteristic of the wellbore or the well tool and transmitting a sensor signal associated with the characteristic; and
   a first computing device coupled to the sensor for receiving the sensor signal from the sensor and transmitting sensor data associated with the sensor signal to the motor controller; and
   wherein the motor controller is configured to receive the sensor data from the first computing device, generate an input signal based on the sensor data and the encoding scheme, and transmit the input signal to the switch for toggling the switch between the first operational state and the second operational state in the arrangement configured to impart the plurality of current pulses on the wireline.

7. The well tool of claim 6, further comprising a capacitor coupled in parallel with the wireline for modifying an amplitude of at least one current pulse of the plurality of current pulses.

8. The well tool of claim 7, wherein:
   the well tool comprises a first telemetry subsystem that includes the sensor, the switch, the motor, the motor controller, the capacitor, and the first computing device; and
   the wireline is coupled to a second telemetry subsystem positioned at the surface of the wellbore for receiving the plurality of current pulses from the first telemetry subsystem via the wireline, determining the data encoded in the plurality of current pulses, and displaying the data.

9. The well tool of claim 8, wherein the second telemetry subsystem comprises:
   a power spike detector coupled to the wireline for detecting the plurality of current pulses and transmitting signals associated with the plurality of current pulses; and
   a second computing device for receiving the signals from the power spike detector, determining the data encoded in the plurality of current pulses based on the signals from the power spike detector, and displaying the data.

10. A communication system for use in a wellbore, the communication system comprising:
    a first telemetry subsystem positioned on a well tool, the first telemetry subsystem including a first computing device that includes:
      a first processor; and
      a first memory in which instructions executable by the first processor are stored for causing the first processor to:
        receive a sensor signal from a sensor indicating a characteristic of the wellbore or the well tool; and
        cause a motor controller to toggle a switch coupled between a motor and a power source in an arrangement based at least in part on an encoding scheme and configured to generate a plurality of current pulses representing the characteristic in a wireline.

11. The communication system of claim 10, further comprising:
    a second telemetry subsystem positionable at a well surface, the second telemetry subsystem including:
      a power spike detector for detecting the plurality of current pulses in the wireline and transmitting signals associated with the plurality of current pulses; and
      a second computing device coupled to the power spike detector and including:
        a second processor; and
        a second memory in which instructions executable by the second processor are stored for causing the second processor to:
          receive the signals from the power spike detector;
          generate decoded data by decoding the plurality of current pulses based on the signals from the power spike detector; and
          determine the characteristic based on the decoded data.

12. The communication system of claim 11, wherein the first telemetry subsystem further comprises the sensor coupled to the first computing device and the motor controller.

13. The communication system of claim 12, wherein the encoding scheme comprises pulse-width modulation, and wherein the well tool comprises a formation-testing tool.

14. The communication system of claim 13, wherein:
    the first telemetry subsystem further comprises the switch and the motor;
    the second telemetry subsystem comprises the power source; and
    the first telemetry subsystem and the second telemetry subsystem are coupled to the wireline.

15. The communication system of claim 14, wherein the power spike detector comprises an ammeter, a voltmeter, or a transformer.

16. The communication system of claim 15, wherein the power spike detector comprises the ammeter coupled in series between the power source and the wireline, and wherein the first telemetry subsystem further comprises:
   a capacitor coupled in parallel with the wireline for modifying an amplitude of at least one current pulse of the plurality of current pulses.

17. A method comprising:
   determining, by a first telemetry subsystem positioned on a well tool, data to transmit to a second telemetry subsystem;
   generating, by a motor controller of the first telemetry subsystem, an input signal comprising the data encoded in the input signal using an encoding scheme;
   transmitting, by the motor controller, the input signal to a switch coupled between a motor and a wireline connected to a power source; and
   generating, by the switch and in response to the input signal, a plurality of current pulses in the wireline and comprising the data encoded in the input signal by electrically coupling and decoupling the motor to the power source in an arrangement based on the input signal.

18. The method of claim 17, wherein the well tool comprises a formation-testing tool, and further comprising determining the data to transmit to the second telemetry subsystem by:
   receiving a sensor signal from a sensor; and
   determining the data based on the sensor signal.

19. The method of claim 18, further comprising generating the input signal by:
   modulating a spacing between two or more pulses of the input signal according to a pulse-width-modulation encoding scheme.

20. The method of claim 19, further comprising:
   detecting, by the second telemetry subsystem and via a power spike detector coupled to the wireline, the plurality of current pulses;
   transmitting, by the power spike detector, signals associated with the plurality of current pulses to a computing device of the second telemetry subsystem;
   receiving, by the computing device, the signals from the power spike detector;
   determining, by the computing device, the data based on the signals from the power spike detector; and
   outputting, by the computing device, the data via a display device.

* * * * *